United States Patent
Hirata et al.

(10) Patent No.: US 6,873,367 B1
(45) Date of Patent: Mar. 29, 2005

(54) ELECTRONIC CAMERA SYSTEM

(75) Inventors: Ryuji Hirata, Hachioji (JP); Kenichi Oinoue, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 884 days.

(21) Appl. No.: 09/583,011

(22) Filed: May 30, 2000

(30) Foreign Application Priority Data

Jun. 3, 1999 (JP) .......................................... 11-156557
Jun. 3, 1999 (JP) .......................................... 11-156558

(51) Int. Cl.[7] .............................................. H04N 5/225
(52) U.S. Cl. ................................... 348/372; 348/231.8
(58) Field of Search ............................... 348/308, 302, 348/207.99, 231.99, 231.1, 231.3, 231.7, 231.8, 372, 373, 375; 250/370.01, 370.08, 370.9

(56) References Cited

U.S. PATENT DOCUMENTS

| | | | |
|---|---|---|---|
| 5,664,243 A | * | 9/1997 | Okada et al. ............... 396/246 |
| 5,742,339 A | * | 4/1998 | Wakui ...................... 348/231.9 |
| 6,525,767 B2 | * | 2/2003 | Saito et al. ............... 348/231.7 |
| 2003/0169349 A1 | * | 9/2003 | Aoi et al. ................. 348/231.2 |

FOREIGN PATENT DOCUMENTS

JP          6-90425          3/1994

* cited by examiner

*Primary Examiner*—Tuan Ho
(74) *Attorney, Agent, or Firm*—Frishauf, Holtz, Goodman & Chick, P.C.

(57) ABSTRACT

In an electronic camera system, a camera body includes a card slot for receiving a memory card M, a card slot for receiving an HDD pack H, and a battery chamber for receiving a battery B. An expansion unit includes a grip portion for receiving a battery back having a power supply capacity larger than that of the battery B, a detection switch for detecting the attached state of the expansion unit to the electronic camera, and an LCD panel for displaying a predetermined alarm message when the HDD pack H is inserted into the card slot, and the detection switch detects that the expansion unit is not attached to the electronic camera.

20 Claims, 15 Drawing Sheets

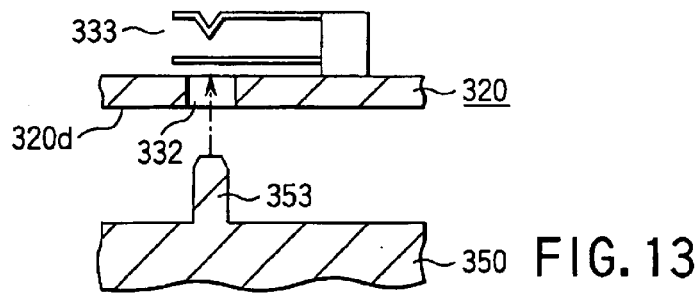
FIG. 13
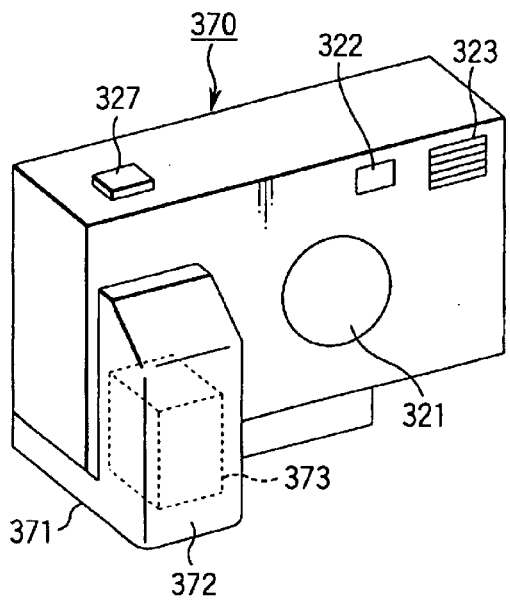
FIG. 14
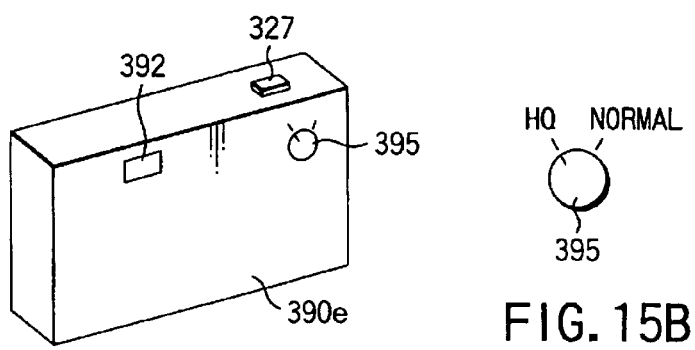
FIG. 15A
FIG. 15B

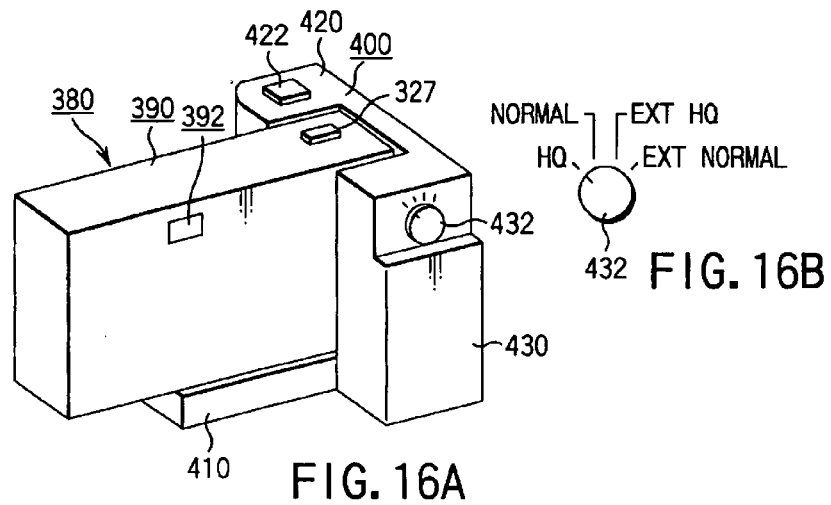
FIG. 16A
FIG. 16B
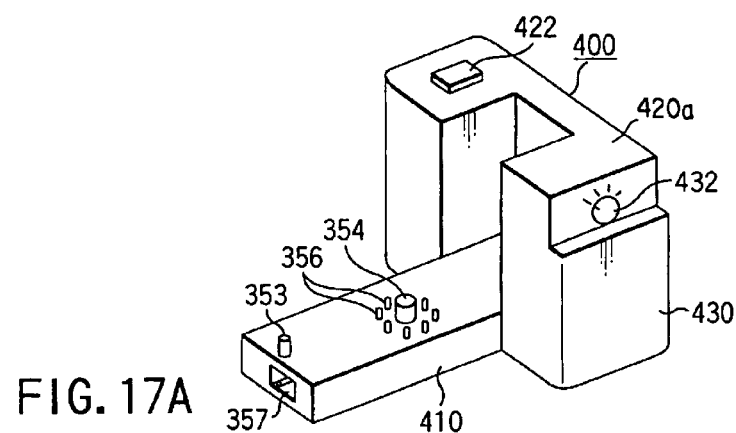
FIG. 17A
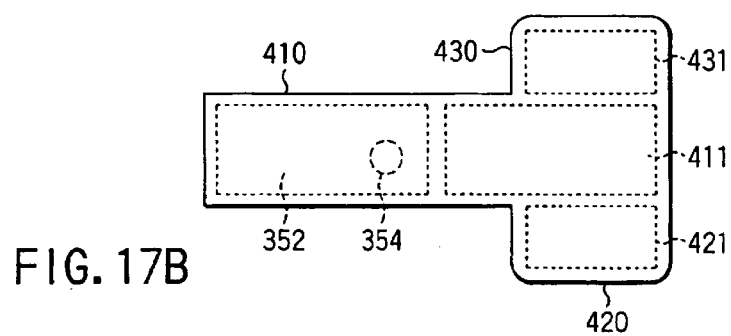
FIG. 17B

ELECTRONIC CAMERA SYSTEM

CROSS-REFERENCE TO RELATED APPLICATIONS

This application claims benefit of Japanese Applications No. Hei 11-156557 filed in Japan on Jun. 3, 1999 and No. Hei 11-156558 filed in Japan on Jun. 3, 1999, the contents of which are incorporated by this reference.

BACKGROUND OF THE INVENTION

The present invention relates to an electronic camera using a memory card as a recording medium.

For electronic cameras which are being popular in recent years, the image quality, i.e., the number of pixels constructing image data has greatly improved along with development of CCD image sensing elements. Accordingly, the data amount per image data is increasing.

A current electronic camera which uses a memory card with a nonvolatile flash ROM as a mainstream recording medium has a limited recording capacity. For this reason, memory cards with larger capacities have been sequentially developed and are commercially available.

Under these circumstances, an electronic camera having, in place of a memory card, a hard disk device or magnetooptical disk device capable of recording a larger quantity of image data has been proposed.

However, an electronic camera having a hard disk device or magnetooptical disk device has the following problem. Since the recording medium has a rotating member, power is required to rotate the recording medium for recording/reproduction, and a battery with a larger capacity is indispensable although the recording medium itself can be made compact to some extent and also incorporated in the camera body. As a result, the entire electronic camera becomes so bulky that it is unsuitable for a compact electronic camera which is easy to carry.

BRIEF SUMMARY OF THE INVENTION

It is an object of the present invention to provide an electronic camera selectively usable in accordance with a situation, which allows a user to easily carry only the camera body as a compact electronic camera or sense high-quality image data and record it on a large-capacity recording medium.

According to the first aspect of the present invention, there is provided an electronic camera system comprising a first recording medium receiving portion provided in an electronic camera to receive a first recording medium for recording image data, a second recording medium receiving portion for receiving a second recording medium having a recording capacity larger than that of the first recording medium, a first power supply provided in the electronic camera to supply power in writing the image data on at least the first recording medium, a second power supply having a power supply capacity larger than that of the first power supply, and an electronic camera expansion unit for receiving the second power supply, the electronic camera expansion unit being detachable from the electronic camera, wherein the second power supply supplies power to write data on the second recording medium when the electronic camera expansion unit is attached to the electronic camera.

According to the second aspect of the present invention, in the invention according to the first aspect, there is provided an electronic camera system further comprising determination means for determining whether the electronic camera expansion unit is attached to the electronic camera, and notification means for, when the second recording medium is inserted into the second recording medium receiving portion, and the determination means determines that the electronic camera expansion unit is not attached to the electronic camera, notifying a user that the electronic camera expansion unit is not attached to the electronic camera.

According to the third aspect of the present invention, in the invention according to the first aspect, there is provided an electronic camera system further comprising determination means for determining whether the electronic camera expansion unit is attached to the electronic camera, and means for, when the determination means determines that the electronic camera expansion unit is not attached to the electronic camera, inhibiting drive of the second recording medium and a write/read of image data.

According to the fourth aspect of the present invention, in the invention according to the first aspect, there is provided an electronic camera system wherein the electronic camera expansion unit comprises a grip portion incorporating the second power supply, and a substantially plate-like flat portion having an end face integrated with the grip portion, and attached to a bottom surface of the electronic camera.

According to the fifth aspect of the present invention, in the invention according to the first aspect, there is provided an electronic camera system wherein the electronic camera further comprises a first power supply receiving portion for receiving the first power supply, the electronic camera expansion unit further comprises a unit main body, a second power supply receiving portion for receiving the second power supply, an attaching mechanism for detachably attaching the unit main body to the electronic camera, and data connection means, electrically connected to the electronic camera, for transmitting/receiving the image data, and the second recording medium receiving portion is provided in the unit main body.

According to the sixth aspect of the present invention, in the invention according to the first aspect, there is provided an electronic camera system wherein the unit main body comprises a grip portion incorporating the second power supply receiving portion and arranged on an end portion side in a horizontal direction of the electronic camera, and a substantially plate-like flat portion integrated with an end portion of the grip portion and attached to a bottom surface of the electronic camera, and incorporating the second recording medium receiving portion and having the data connection means formed at an abutment portion against the bottom surface of the electronic camera.

According to the seventh aspect of the present invention, in the invention according to the sixth aspect, there is provided an electronic camera system wherein the second recording medium has a rotating member, and the second recording medium receiving portion is arranged on a side of the grip portion of the flat portion.

According to the eighth aspect of the present invention, in the invention according to the sixth aspect, there is provided an electronic camera system wherein the flat portion has, at a position separated from the grip portion via the second recording medium receiving portion, a circuit section for executing the write/read of the image data on/from the second recording medium and transmission/reception of the image data through the connection means by power supplied from the second power supply.

According to the ninth aspect of the present invention, in the invention according to the sixth aspect, there is provided an electronic camera system wherein the electronic camera has a cover for protecting an insertion port of the first recording medium into the first recording medium receiving portion, and the grip portion has a recessed portion not to impede opening/closing the cover.

According to the 10th aspect of the present invention, in the invention according to the sixth aspect, there is provided an electronic camera system wherein the grip portion has, at an upper portion, a release switch for instructing a release operation in the electronic camera.

According to the 11th aspect of the present invention, in the invention according to the fifth aspect, there is provided an electronic camera system wherein the second recording medium can be freely removed from the second recording medium receiving portion, and the second recording medium receiving portion is arranged at a portion where the second recording medium can be removed even while the unit main body is being attached to the electronic camera.

According to the 12th aspect of the present invention, in the invention according to the fifth aspect, there is provided an electronic camera system wherein the attaching mechanism has a screw threadably engaging with a tripod screw hole of the electronic camera, and the connection means has a plurality of contacts disposed on a circumference centered on the screw.

According to the 13th aspect of the present invention, in the invention according to the sixth aspect, there is provided an electronic camera system wherein the flat portion has, at positions corresponding to the plurality of contacts forming the connection means, a circuit section for executing the write/read of the image data on/from the second recording medium and transmission/reception of the image data through the connection means by power supplied from the second power supply.

According to the 14th aspect of the present invention, in the invention according to the fifth aspect, there is provided an electronic camera system wherein the unit main body further comprises a switch for inhibiting the write/read of the image data on/from the second recording medium.

According to the 15th aspect of the present invention, in the invention according to the fifth aspect, there is provided an electronic camera system wherein the unit main body further comprises an input terminal for supplying external DC power to the power supply.

According to the 16th aspect of the present invention, in the invention according to the sixth aspect, there is provided an electronic camera system wherein the grip portion has a pair of members sandwiching the electronic camera from a front side and rear side, each of the pair of members having the second power supply receiving portion.

According to the 17th aspect of the present invention, in the invention according to the 16th aspect, there is provided an electronic camera system wherein the electronic camera has, on a rear surface side, a first image quality selection switch for switching image quality, one of the pair of members, which is located on the rear surface side of the electronic camera, covers the first image quality selection switch, and has a second image quality selection switch having an image quality selection position for simultaneously instructing priority recording on the second recording medium.

According to the 18th aspect of the present invention, in the invention according to the first aspect, there is provided an electronic camera system wherein the electronic camera comprises detection means for detecting an attached state of the electronic camera expansion unit to the electronic camera, and a first power supply receiving portion for receiving the first power supply, and the electronic camera expansion unit comprises the second recording medium receiving portion, a second power supply receiving portion for receiving the second power supply, an attaching mechanism for attaching a unit main body of the electronic camera expansion unit to the electronic camera, and connection means, electrically connected to the electronic camera, for transmitting/receiving the image data.

According to the 19th aspect of the present invention, in the invention according to the 18th aspect, there is provided an electronic camera system wherein the attaching mechanism has, on an abut surface against the electronic camera, a projecting portion for positioning the electronic camera, and the detection means is arranged at a position corresponding to the projecting portion to detect that the projecting portion abuts.

According to the 20th aspect of the present invention, in the invention according to the first aspect, there is provided an electronic camera system wherein the first recording medium comprises a memory card, and the second recording medium comprises a hard disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a longitudinal sectional view showing a detection section incorporated in the electronic camera.

FIG. 14 is a perspective view showing an electronic camera system according to the third embodiment of the present invention in which an expansion unit is attached to an electronic camera.

FIG. 15A is a perspective view showing an electronic camera system according to the fourth embodiment of the present invention.

FIG. 15B is a front view showing the first image quality selection switch of the electronic camera system according to the fourth embodiment of the present invention.

FIG. 16A is a perspective view showing a state wherein an expansion unit is attached to an electronic camera.

FIG. 16B is a front view showing a second image quality selection switch.

FIG. 17A is a perspective view showing the expansion unit.

FIG. 17B is a bottom view showing the expansion unit.

DETAILED DESCRIPTION OF THE INVENTION

<First Embodiment>

FIGS. 1A to 5 are views showing an electronic camera 10 according to the first embodiment of the present invention. The electronic camera 10 comprises a camera body 20 and external unit 40.

Figure 1A:
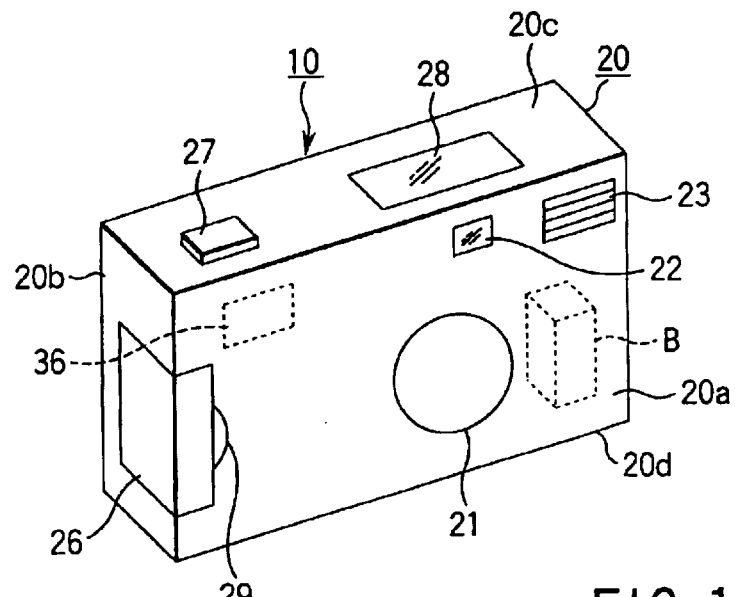
FIG. 1A is a perspective view showing the camera body of an electronic camera according to the first embodiment of the present invention.
Figure 1B:
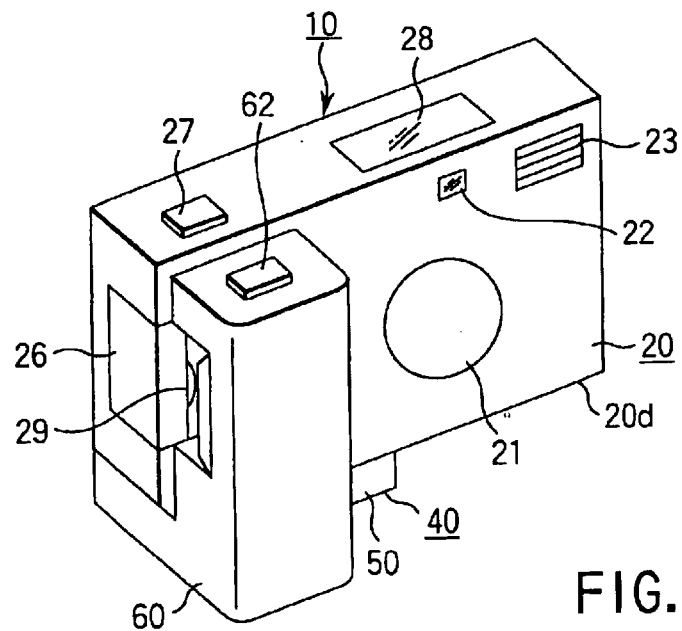
FIG. 1B is a perspective view showing a state wherein an external unit is attached to the camera body in the first embodiment.

As shown in FIG. 1A, a front surface 20a of the camera body 20 has an image sensing lens 21, an objective portion 22 of an optical viewfinder, an electronic flash 23, and a concave nail mark 29 as a hook position for opening a media slot cover 26 (to be described later).

Figure 2A:
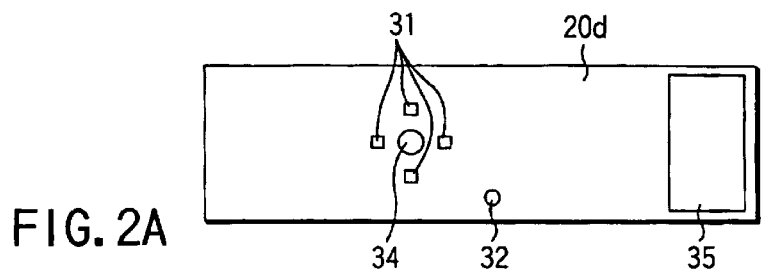
FIG. 2A is a bottom view showing the camera body of the electronic camera according to the first embodiment.
Figure 2B:
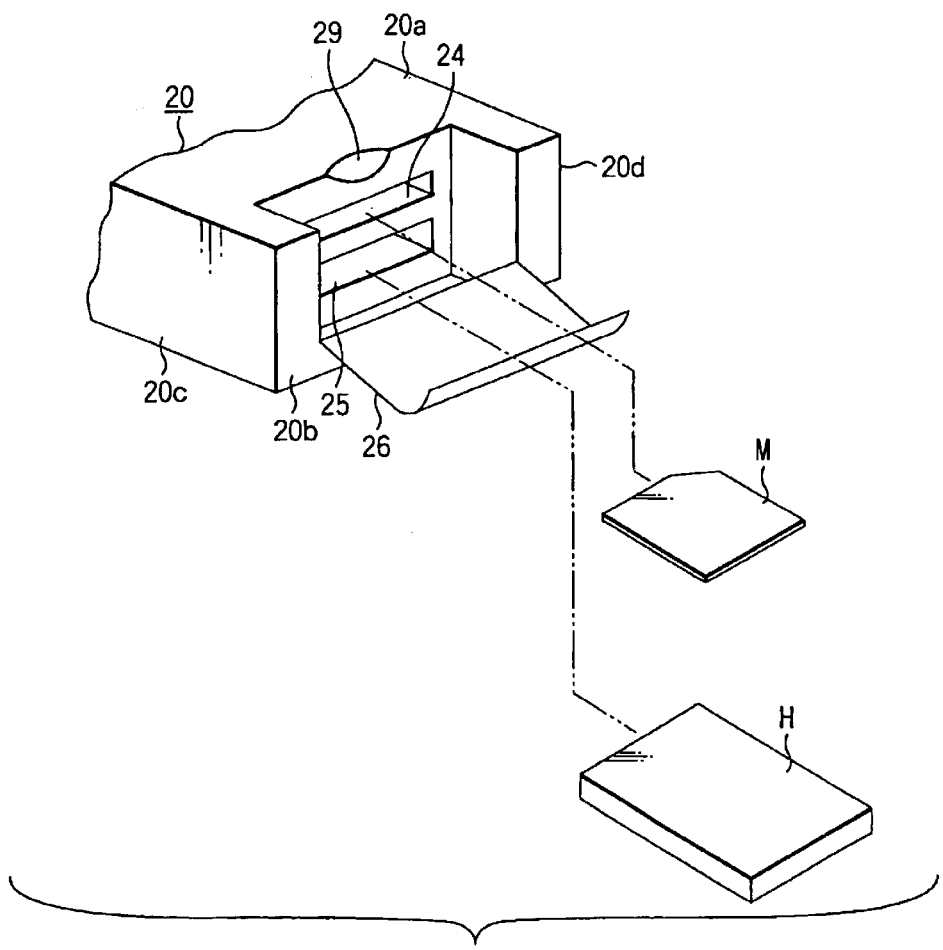
FIG. 2B is a view showing the card slot of the camera body of the electronic camera according to the first embodiment.

A side surface 20b of the camera body 20 has a card slot (first recording medium receiving portion) 24, a card slot (second recording medium receiving portion) 25, and the media slot cover 26 covering the card slots 24 and 25, as shown in FIG. 2B. The card slots 24 and 25 are designed to freely detachably receive a memory card (first recording medium) M having a storage capacity of, e.g., 8 MB and an HDD pack H having a larger storage capacity of, e.g., 350 MB than that of the memory card M, respectively. The HDD pack H uses a disk-like storage member as a recording medium.

An upper surface 20c of the camera body 20 has a release switch 27, and an LCD panel (notification means) 28 for indicating the state of the electronic camera 10 and the number of sensed images.

A bottom surface 20d of the camera body 20 has electric contacts 31 connected to connecting pins 58 (to be described later), a hole portion 32 for receiving a positioning pin 52 (to be described later), and a tripod screw hole 34, as shown in FIG. 2A. A battery cover 35 which is opened to exchange the battery is provided on the camera bottom surface 20d on the electronic flash side.

The camera body 20 incorporates a battery chamber for accommodating, inside the battery cover 35, a battery B (first power supply) for supplying power to the entire camera body 20, a detection switch (detection means) 33 which is provided inside the hole portion 32 and turned on when the positioning pin 52 is inserted, and a control circuit board 36 connected to the detection switch 33 to detect connection/disconnection of the external unit 40. The control circuit board 36 also detects insertion/removal of the memory card M or HDD pack H into/from the card slot 24 or 25 and controls contents displayed on the LCD panel.

Figure 3A:
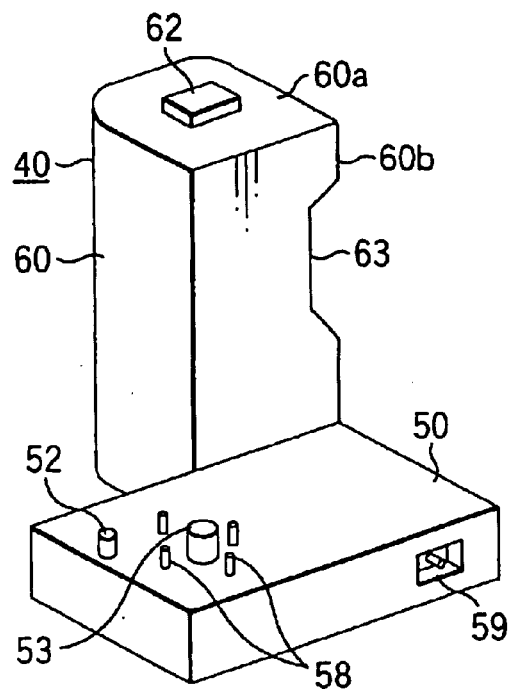
FIG. 3A is a perspective view showing the external unit attached to the camera body of the electronic camera according to the first embodiment.
Figure 3B:
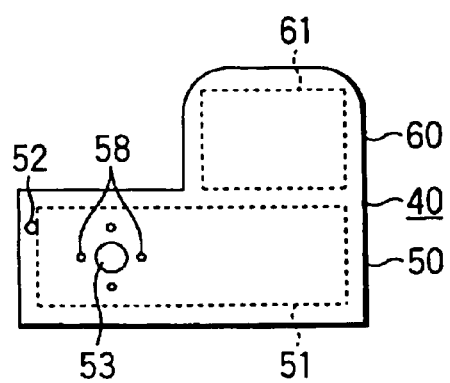
FIG. 3B is a bottom view showing the external unit attached to the camera body of the electronic camera according to the first embodiment.

As shown in FIGS. 3A and 3B, the external unit 40 comprises a plate-like flat portion 50 formed in correspondence with the bottom surface 20d of the camera body 20, and a grip portion 60 integrated with an end portion of the flat portion 50 and provided on the front surface 20a close to the side surface 20b of the camera body 20.

The flat portion 50 incorporates a circuit board 51. The upper surface of the flat portion 50 has the positioning pin 52 for fixing the connection position to the camera body 20, a tripod screw 53 threadably engaging with the tripod screw hole 34 of the above-described camera body 20, and the four connecting pins 58 electrically connected to the electric contacts 31 on the camera body 20 side.

Figure 4:
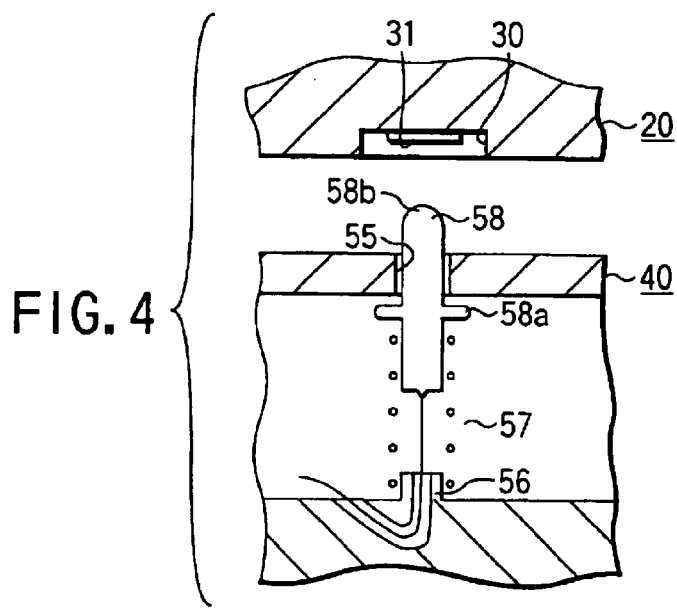
FIG. 4 is a longitudinal sectional view showing the main part of the camera body and external unit in the first embodiment.
Figure 5:
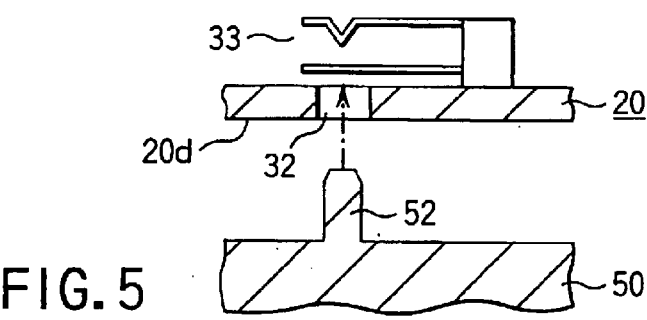
FIG. 5 is a longitudinal sectional view showing a detection section incorporated in the electronic camera according to the first embodiment.

As shown in FIG. 4, each connecting pin 58 has a flange portion 58a, and a distal end portion 58b inserted into a hole portion 55 formed in the upper surface of the flat portion 50. A compression coil spring 57 coaxial with the connecting pin 58 is inserted between the flange portion 58a and a convex portion 56 formed at a position opposing the hole portion 55 of the flat portion 50. Hence, the distal end portion 58b of the connecting pin projects from the upper surface of the flat portion 50 by a predetermined amount.

The flat portion 50 also has a DC inlet 59 to which an external power supply is connected.

The grip portion 60 has an outer shape easily gripped by the user. The grip portion 60 incorporates a battery pack 61. An upper surface 60a of the grip portion 60 has a release switch 62. A side surface 60b of the grip portion 60 has a recessed portion 63. The recessed portion 63 allows the user to open/close the media slot cover 26 even when the external unit 40 is attached to the camera body 20.

The electronic camera 10 with the above arrangement is used in the following way. The electronic camera 10 performs two operations: "normal mode" and "large-capacity mode". More specifically, when the memory card M is inserted into the card slot 24 while the HDD pack H is not inserted into the card slot 25, the "normal mode" is set. In this mode, an image can be sensed like an ordinary electronic camera without attaching the external unit 40.

When the HDD pack H is inserted into the card slot 25, this insertion is detected, and the "large-capacity mode" is set. In this case, since relatively high power is consumed especially to start rotating the disk in the HDD pack H, the external unit 40 with the battery pack 61 having a large-capacity power supply must be attached.

The external unit 40 is attached by screwing the tripod screw 53 of the flat portion 50 into the tripod screw hole 34 of the camera body 20. At this time, the distal ends of the connecting pins 58 abut against the electric contacts 31, and the connecting pins 58 are pressed downward against the spring force of the compression springs 57. Since the connecting pins 58 and electric contacts 31 are brought into contact with each other at predetermined pressure, power from the large-capacity battery pack 61 and a release signal from the release switch 62 are reliably supplied to the camera body 20 side.

In attaching the external unit 40, the positioning pin 52 is inserted into the hole portion 32 to turn on the detection switch 33. Thus, the control circuit board 36 as a control section in the camera body detects that the external unit 40 is attached.

When the HDD pack H is inserted into the card slot 25 while the external unit 40 is not attached, the detection switch 33 is not turned on. The control section 36 blinks, on the LCD panel 28, "OP BAT" as an alarm indicator 28b of an optional battery, thereby prompting the user to attach the external unit 40. An indicator 28a indicates, e.g., the minimum number of sensible images (26 in this case) for the currently set image quality. If the external unit 40 is not attached, use of the HDD pack H is inhibited to suppress consumption of the battery B. More specifically, rotation of the disk-like storage member in the HDD pack H and image data write/read are inhibited.

Figure 6:
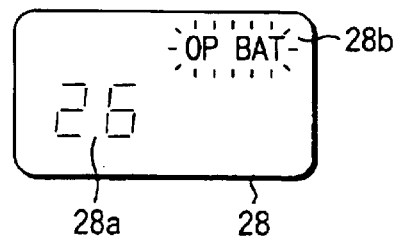
FIG. 6 is a view showing contents displayed on an LCD panel.
Figure 7:
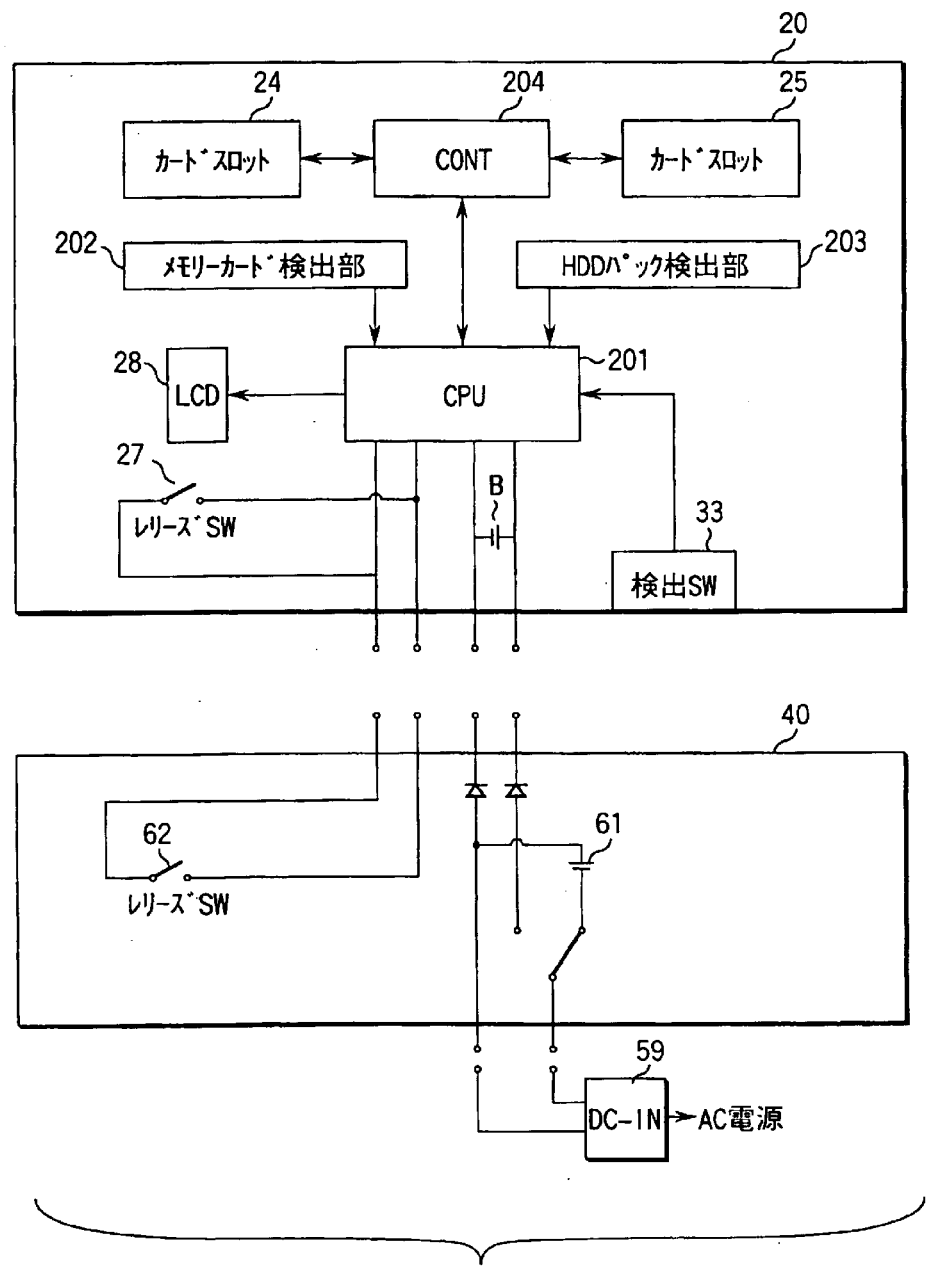
FIG. 7 is a block diagram showing the schematic arrangement of hardware of the electronic camera according to the first embodiment.

FIG. 7 is a block diagram showing the schematic arrangement of hardware of the electronic camera according to the first embodiment. The same reference numerals as in FIGS. 1A to 6 denote the same parts in FIG. 7, and a detailed description thereof will be omitted.

Referring to FIG. 7, a CPU 201 controls the entire camera 20. A memory card detection section 202 and HDD pack detection section 203 detect the memory card inserted into the card slot 24 and the HDD pack inserted into the card slot 25, respectively, and output a detection signal to the CPU 201.

A controller 204 controls the data read/write from/to the memory card inserted into the card slot 24 or the HDD pack inserted into the card slot 25 on the basis of a command from the CPU 201. The CPU 201 and controller 204 are mounted on the control circuit board 36.

As shown in FIG. 7, the battery pack 61 stored in the external unit 40 supplies power for driving the HDD to the camera body 20 when the external unit 40 is attached to the camera body 20.

Figure 8:
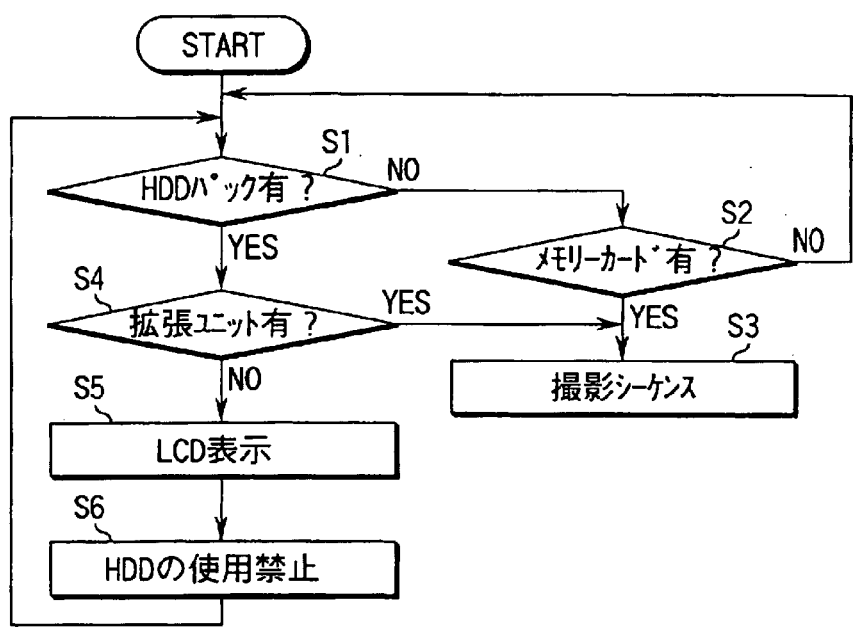
FIG. 8 is a flow chart for explaining operation of the electronic camera according to the first embodiment.

Operation of the above-described electronic camera will be described below with reference to a flow chart shown in FIG. 8.

The CPU 201 determines first on the basis of a detection signal from the HDD pack detection section 203 whether the HDD pack is inserted into the card slot 25 (S1). If NO in step S1, it is determined next whether the memory card is inserted (S2). The memory card is detected on the basis of a detection signal from the memory card detection section 202.

If NO in step S2, i.e., when neither the memory card nor the HDD pack is inserted, the flow returns to step S1. If YES in step S2, the flow advances to an image sensing sequence (S3).

If YES in step S1, it is determined next whether the external unit is attached (S4). If YES in step S4, the flow advances to the image sensing sequence in step S3.

If NO in step S4, the CPU 201 displays "OP BAT" on the LCD panel 28, as shown in FIG. 6 (S5). Whether the external unit is attached is determined on the basis of a detection signal from the detection switch 33.

The CPU 201 instructs the controller 204 to inhibit use of the HDD (S6). Thus, a write/read to/from the HDD is not performed, and power consumption can be saved.

As described above, in the electronic camera 10 according to the first embodiment, when the HDD pack H with large power consumption is inserted, the external unit 40 incorporating the large-capacity battery pack 61 need indispensably be attached. If the external unit 40 is not attached, the user is notified of it on the LCD panel 28 and prompted to attach the external unit 40.

If the external unit 40 is not attached while the HDD pack H is inserted, the function of the HDD pack H is stopped to avoid large consumption of the battery B.

In addition, since the grip portion 60 which is gripped in place of the camera body 20 when the external unit 40 is attached is provided, and the battery pack 61 as a heavy object is incorporated in the grip portion 60, the weight unbalance of the portable camera can be prevented.

The present invention is not limited to the above embodiment, and various changes and modifications can be made without departing from the spirit and scope of the present invention.

According to the electronic camera of the present invention, the following effects are obtained.

(1) When the second recording medium with large power consumption is inserted, the external unit incorporating the second power supply need indispensably be attached. If the external unit is not attached, the user is notified of it and prompted to attach the external unit.

(2) If the external unit is not attached while the second recording medium is inserted, the function of the second recording medium is stopped to avoid large consumption of the first power supply.

(3) Since the grip portion which is gripped in place of the camera body when the external unit is attached is provided, and the second power supply as a heavy object is incorporated in the grip portion, the weight unbalance of the portable camera can be prevented.

<Second Embodiment>

FIGS. 9A to 13 are views showing an electronic camera system 310 according to the second embodiment of the present invention. The electronic camera system 310 comprises an electronic camera 320 and expansion unit 340.

Figure 9A:
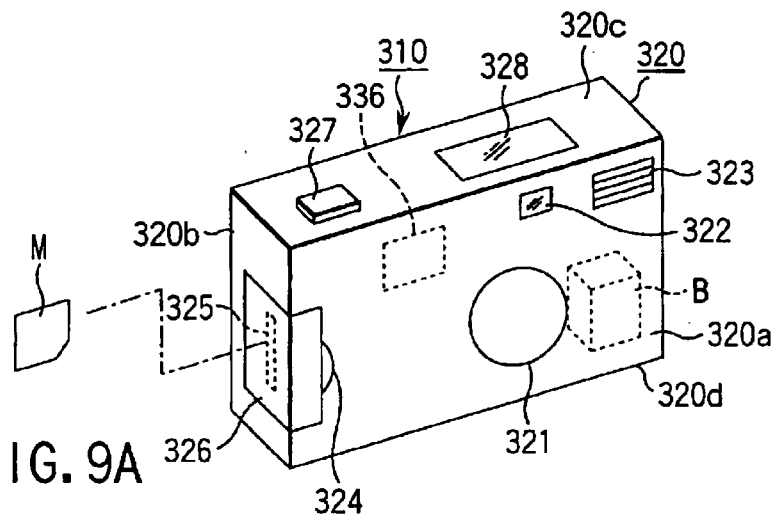
FIG. 9A is a perspective view showing an electronic camera system according to the second embodiment of the present invention.

As shown in FIG. 9A, a front surface 320a of the electronic camera 320 has an image sensing lens 321, an objective portion 322 of an optical viewfinder, an electronic flash 323, and a concave nail mark 324 as a hook position for opening a media slot cover 326 (to be described later).

A side surface 320b of the electronic camera 320 has a card slot (first recording medium receiving portion) 325 and the media slot cover 326 covering the card slot 325. The card slot 325 is designed to freely detachably receive a memory card (first recording medium) M having a storage capacity of, e.g., 8 MB.

An upper surface 320c of the electronic camera 320 has a release switch 327, and an LCD panel 328 for indicating the state of the electronic camera system 310 and the number of sensed images.

Figure 9B:
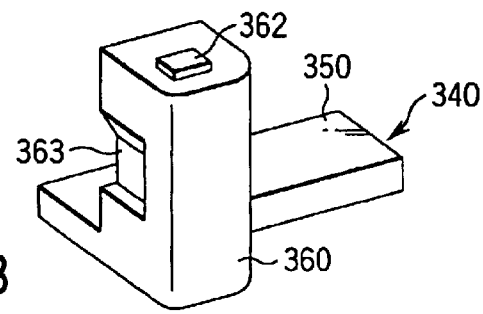
FIG. 9B is a perspective view showing the expansion unit of the electronic camera system according to the second embodiment of the present invention.
Figure 9C:
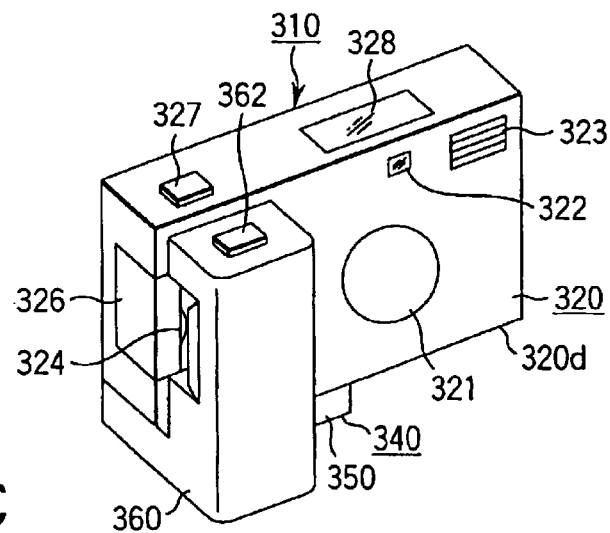
FIG. 9C is a perspective view showing a state wherein the expansion unit of the electronic camera system according to the second embodiment of the present invention is attached to an electronic camera.
Figure 9D:
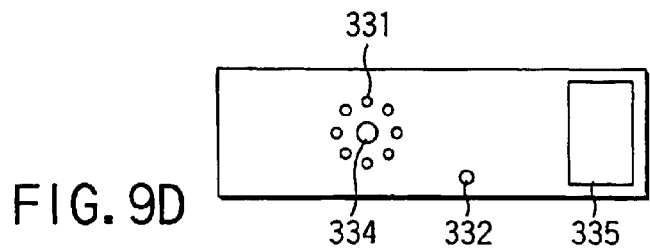
FIG. 9D is a bottom view showing the electronic camera.

A bottom surface 320d of the electronic camera 320 has contacts 331 connected to connecting pins 356 (to be described later), a hole portion 332 for receiving a positioning pin 353 (to be described later), and a tripod screw hole 334, as shown in FIG. 9D. A battery cover 335 which is opened to exchange the battery is provided on the camera bottom surface 320d on the electronic flash side.

The electronic camera 320 incorporates a battery chamber for accommodating, inside the battery cover 335, a battery B (first power supply) for supplying power to the electronic camera 320, a detection switch (detection means) 333 which is provided inside the hole portion 332 and turned on when the positioning pin 353 is inserted, and a control circuit board 336 forming a control section connected to the detection switch 333 to detect connection/disconnection of the expansion unit 340. This control section also controls contents displayed on the LCD panel 328.

Figure 10A:
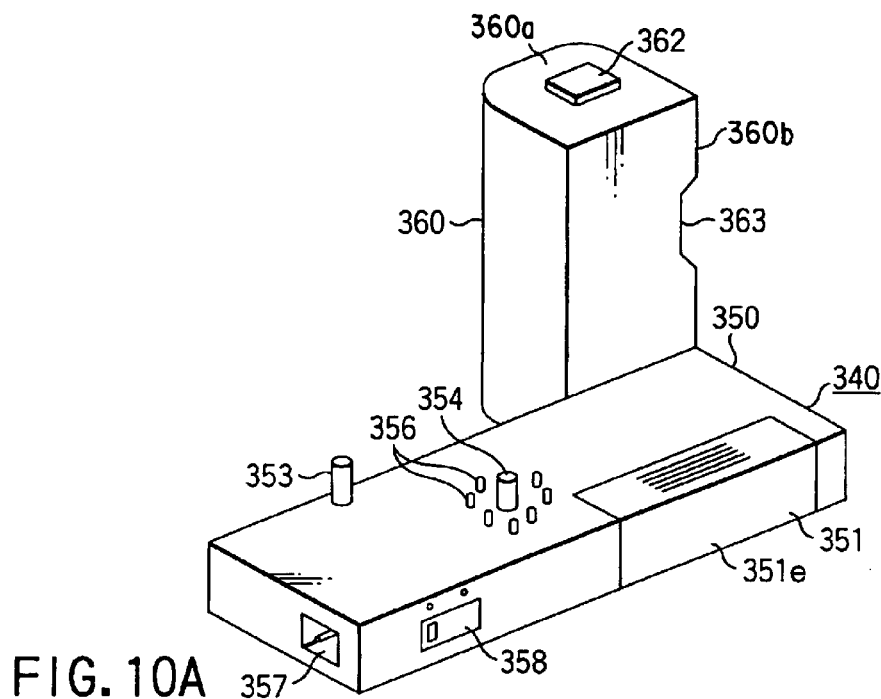
FIG. 10A is a perspective view showing the expansion unit.
Figure 10B:
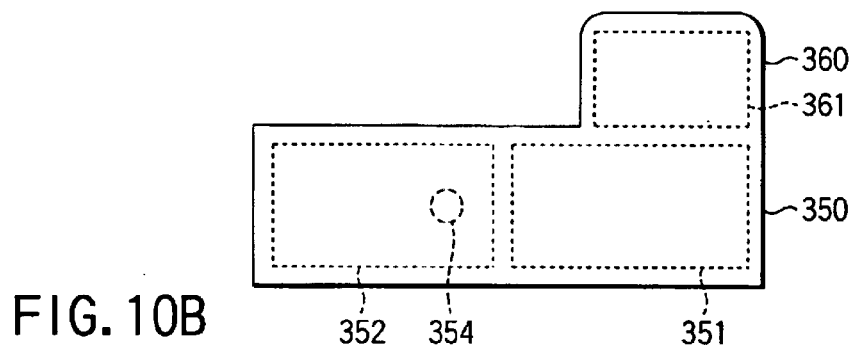
FIG. 10B is a bottom view showing the expansion unit.

As shown in FIGS. 9B, 10A, and 10B, the expansion unit 340 comprises a plate-like flat portion 350 formed in correspondence with the bottom surface 320d of the electronic camera 320, and a grip portion 360 integrated with an end portion of the flat portion 350 and provided on the front surface 320a close to the side surface 320b of the electronic camera 320.

The flat portion 350 incorporates an HDD pack receiving portion (second storage medium receiving portion) 351, and a circuit board 352 arranged on the opposing side of the grip portion 360 via the HDD pack receiving portion 351. The upper surface of the flat portion 350 has the positioning pin 353, a tripod screw (attaching mechanism) 354 threadably engaging with the tripod screw hole of the above-described electronic camera 320, and the eight connecting pins 356 provided near the circuit board 352.

Figure 10C:
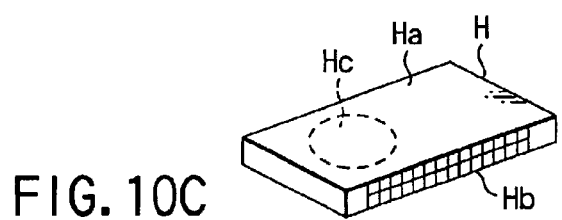
FIG. 10C is a perspective view showing an HDD pack incorporated in the expansion unit.
Figures 11A, 11B:
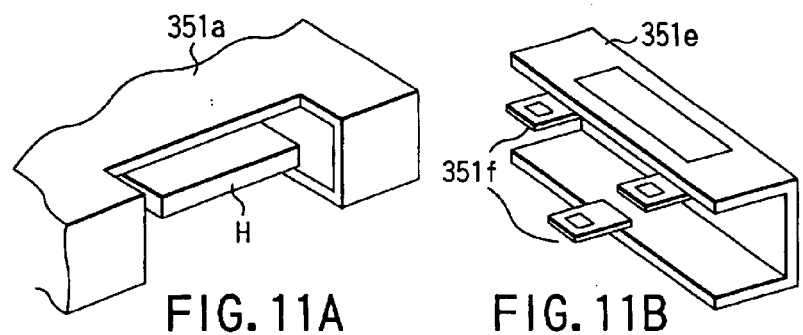
FIG. 11A is a perspective view showing a second recording medium receiving portion incorporated in the expansion unit.
FIG. 11B is a perspective view showing a protective cover.
Figure 11C:
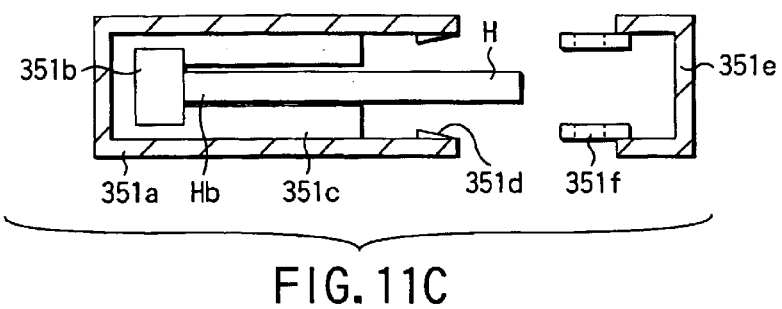
FIG. 11C is a longitudinal sectional view showing the second recording medium receiving portion.

The HDD pack receiving portion 351 freely detachably receives an HDD pack (second recording medium) H as shown in FIG. 10C. The HDD pack H comprises a case Ha, a 50-pin connector Hb provided on a side surface of the case Ha, and a 1-inch hard disk Hc connected to the connector Hb and accommodated in the case Ha.

The HDD pack receiving portion 351 comprises a housing 351a, a connector 351b connected to the connector Hb of the HDD pack H, a support portion 351c for supporting the case Ha of the HDD pack H, projecting portions 351d provided in the housing 351a and engaged with engaging portions 351f (to be described later), a protective cover 351e for protecting the HDD pack receiving portion 351, and the engaging portions 351f provided in the protective cover 351e and engaged with the above-described projecting portions 351d.

The protective cover 351e of the HDD pack receiving portion 351 allows the user to exchange the HDD pack H even when the expansion unit 340 is attached to the electronic camera 320.

Figures 12A, 12B:
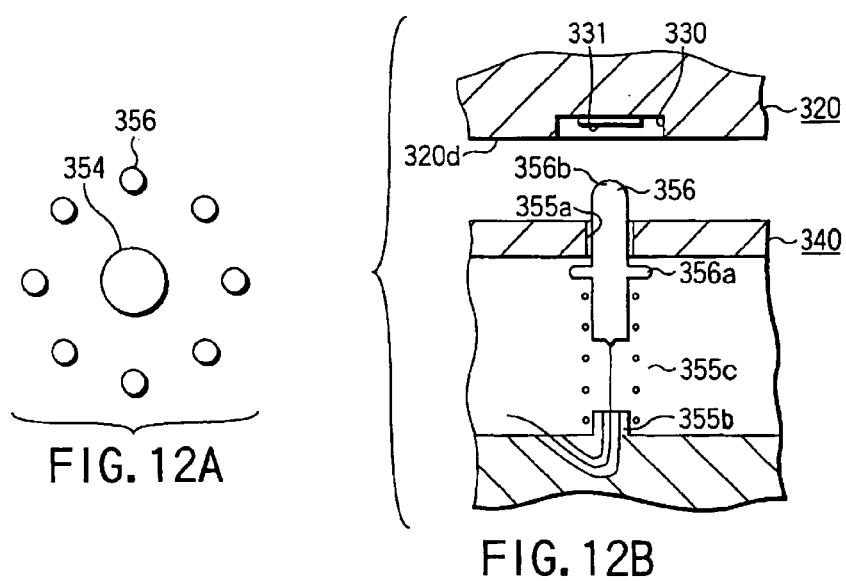
FIG. 12A is a plan view showing connecting pins.
FIG. 12B is a longitudinal sectional view showing a connecting pin.

As shown in FIG. 12B, each connecting pin 356 has a flange portion 356a, and a distal end portion 356b inserted into a hole portion 355a formed in the upper surface of the flat portion 350. A compression spring 355c coaxial with the connecting pin 356 is inserted between the flange portion 356a and a convex portion 355b formed at a position opposing the hole portion 355a of the flat portion 350. Hence, the distal end portion 356b of the connecting pin 356 projects from the upper surface of the flat portion 350 by a predetermined amount.

The connecting pins 356 have a function of electrically connecting the circuit board 352 to the control circuit board 336 of the electronic camera 320 and supplying power from the battery pack 361 to the electronic camera 320. When the connecting pins 356 and circuit board 352 are close to each other, the wire leading distance can be minimized.

The flat portion 350 has a DC inlet 357 connected to an external DC power supply such as an AC adapter, and an HDD switch 358 for turning on/off operation of the HDD pack H.

The grip portion 360 has an outer shape easily gripped by the user. The grip portion 360 incorporates a battery pack (second power supply) 361. An upper surface 360a of the grip portion 360 has a release switch 362. A side surface 360b of the grip portion 360 has a recessed portion 363. The recessed portion 363 allows the user to open/close the media slot cover 326 even when the expansion unit 340 is attached to the electronic camera 320.

Even when the expansion unit 340 is attached to make it hard to operate the release switch 327 of the electronic camera 320, the same operability can be obtained because the grip portion 360 has the release switch 362.

The electronic camera system 310 with the above arrangement is used in the following way. The electronic camera system 310 performs two operations: "normal mode" and "expansion mode". When the expansion unit 340 is not attached, the "normal mode" is set to sense an image like an ordinary electronic camera.

When the expansion unit 340 is attached, the "expansion mode" is set. The expansion unit 340 is attached by screwing the tripod screw 354 of the flat portion 350 into the tripod screw hole 334 of the electronic camera 320. At this time, the positioning pin 353 is inserted into the electronic camera 320 from the hole portion 332 to actuate the detection switch 333. Thus, the control circuit board 336 detects that the expansion unit 340 is attached, and the "expansion mode" is set.

When the distal ends of the connecting pins 356 abut against the contacts 331, the connecting pins 356 are pressed downward against the spring force of the compression springs 357. The connecting pins 356 and contacts 331 come into contact at a predetermined contact pressure. Hence, power is reliably supplied from the battery pack 361 to the electronic camera 320 side, and the circuit board 352 and control circuit board 336 are reliably connected to enable transmission/reception of image data or release signal.

When the expansion unit 340 is attached, the HDD switch 358 can be turned off to stop using the HDD pack H. More specifically, rotation of the disk-like storage member in the HDD pack H and image data write/read are stopped. In this case, the expansion unit 340 is used only as an expansion power supply for supplying power from the battery pack 361 to the electronic camera 320.

Figure 18:
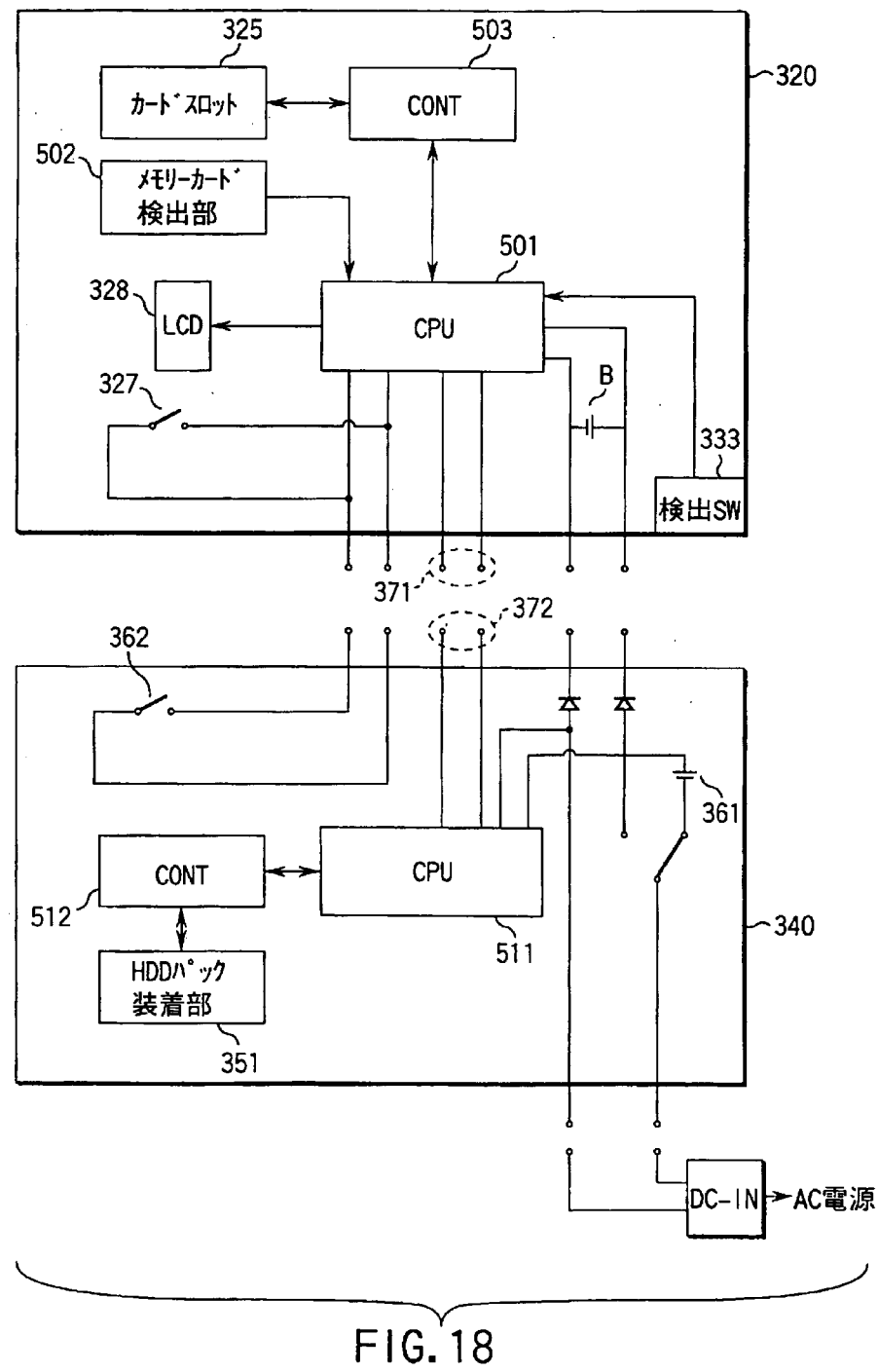
FIG. 18 is a block diagram showing the schematic arrangement of hardware of the electronic camera system according to the second embodiment of the present invention.

FIG. 18 is a block diagram showing the schematic arrangement of hardware of the electronic camera system according to the second embodiment of the present invention. The same reference numerals as in FIGS. 9A to 13 denote the same parts in FIG. 18, and a detailed description thereof will be omitted.

Referring to FIG. 18, a CPU 501 of the electronic camera 320 controls the entire electronic camera 320. A memory card detection section 502 detects the memory card inserted into the card slot 325 and outputs a detection signal to the CPU 501.

A controller 503 controls the read/write from/to the memory card inserted into the card slot 325 on the basis of a command from the CPU 501. The CPU 501 and controller 503 are mounted on the control circuit board 336.

A CPU 511 of the expansion unit 340 controls the entire expansion unit 340. More specifically, the CPU 511 controls the write/read to/from the HDD inserted into the HDD pack receiving portion 351 and transmission of image data read out from the HDD to the electronic camera 320.

Image data read out from the HDD and control commands are transmitted through terminals 371 of the electronic camera 320 and terminals 372 of the expansion unit 340.

A controller 512 controls the HDD pack on the basis of a control command from the CPU 511. The CPU 511 and controller 512 are mounted on the circuit board 352.

Figure 19:
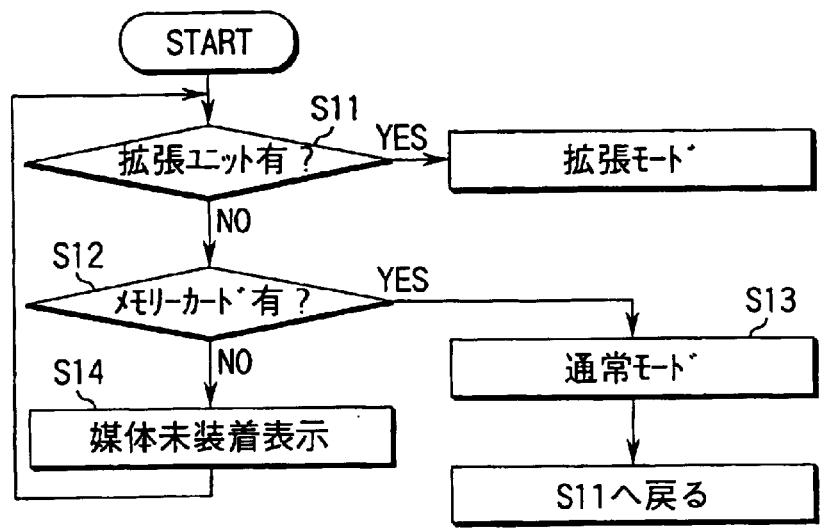
FIG. 19 is a flow chart for explaining operation of the electronic camera system according to the second embodiment of the present invention.
Figure 20:
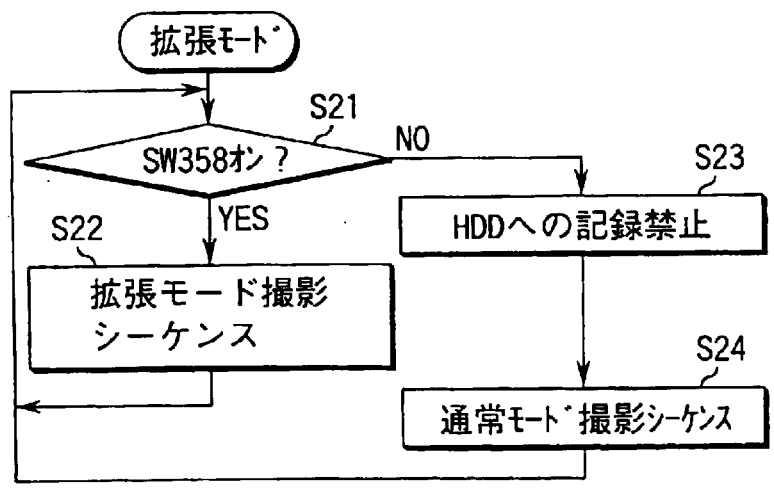
FIG. 20 is a flow chart for explaining operation of the electronic camera system according to the second embodiment of the present invention.

FIGS. 19 and 20 are flow charts for explaining operation of the electronic camera system according to the second embodiment of the present invention.

First, the CPU 501 determines on the basis of the detection signal from the detection switch 333 whether the expansion unit 340 is attached (S11). If YES in step S1, the flow advances to the expansion mode shown in FIG. 20.

In the expansion mode, it is determined first whether the HDD switch 358 which is provided in the expansion unit 340 to turn on/off operation of the HDD pack is ON (S21). The CPU 501 of the electronic camera is notified of the ON/OFF state of the HDD by the CPU 511 of the expansion unit through the terminals 371 and 372.

If YES in step S21, the flow advances to an expansion mode image sensing sequence (S22) and then returns to step S21. If NO in step S21, recording in the HDD is inhibited (S23). The flow advances to a normal mode image sensing sequence (S24) and then returns to step S21.

If NO in step S11, it is determined whether the memory card is inserted (S12). If YES in step S12, the flow advances to the normal mode (S13) and then returns to step S11.

If NO in step S12, a message representing that no medium is inserted is displayed (S14), and the flow returns to step S11.

Inhibition of recording in the HDD has been described above. Instead, use of the HDD may be inhibited by inhibiting a read from the HDD.

As described above, in the electronic camera system 310 according to the second embodiment, the stand-alone electronic camera 320 can be easily carried as a compact electronic camera. In addition, when the expansion unit 340 is attached to the electronic camera 320, the number of recordable images can be largely increased, and the electronic camera can be selectively used in accordance with requirements of a situation: for example, high-quality image data can be sensed and recorded on a large-capacity recording medium in the expansion unit 340, or the continuous operable time is prolonged.

In addition, since the grip portion 360 which is gripped in place of the electronic camera 320 when the expansion unit 340 is attached is provided, and the battery pack 361 as a heavy object is incorporated in the grip portion 360., the weight unbalance of the portable camera can be prevented.

Furthermore, when the HDD pack H having a rotating member easily affected by vibration is located on the grip portion 360 side where displacement due to swing of the camera is relatively small, the influence of vibration caused by camera shake can be minimized.

Also, when the circuit section having a relatively high resistance to vibration is located on a side separated from the grip portion 360, where displacement due to swing of the camera is large, the remaining members easily affected by vibration can be laid out close to the grip portion 360. Hence, the influence of vibration caused by camera shake can be minimized.

<Third Embodiment>

FIG. 14 is a perspective view showing an electronic camera system 370 according to the third embodiment of the present invention. The same reference numerals as in FIG. 9 denote the same functional parts in FIG. 14.

The electronic camera system 370 is different from the above-described electronic camera system 310 in that the electronic camera system 370 uses an expansion unit 371 in place of the expansion unit 340. The expansion unit 371 has a grip portion 372 shorter than the above-described grip portion 360. The grip portion (second power supply receiving portion) 372 incorporates a battery pack (second power supply) 373 having a smaller capacity than that of the above-described battery pack 361. The grip portion 372 has no release switch.

The electronic camera system 370 can also obtain the same effects as those of the above-described electronic camera system 310.

<Fourth Embodiments

FIGS. 15A to 17B are views showing an electronic camera system 380 according to the fourth embodiment of the present invention. The same reference numerals as in FIG. 9 denote the same functional parts in FIGS. 15A to 17B.

The electronic camera system 380 comprises an electronic camera 390 and expansion unit 400.

A rear surface 390e of the electronic camera 390 has an eyepiece portion 392 of an optical viewfinder, as shown in FIG. 15A. An image quality selection switch 395 has two positions "HQ" and "NORMAL" which represent high-quality image recording in a memory card M and normal-quality image recording in the memory card M, respectively.

The electronic camera 390 incorporates a control circuit board 336 for controlling the entire electronic camera system 380, and a battery chamber (first power supply receiving portion) having a battery (first power supply) B for supplying power to the electronic camera 390. In the control circuit board 336, connection/disconnection of the expansion unit 400 is detected by a detection switch 333.

As shown in FIGS. 16A to 17B, the expansion unit 400 comprises a plate-like flat portion 410 formed along a bottom surface 390d of the electronic camera 390, and a pair of grip portions 420 and 430 integrated with one end portion of the flat portion 410 and arranged to sandwich the electronic camera 390.

The flat portion 410 incorporates an HDD pack receiving portion (second storage medium receiving portion) 411, and a circuit board 352 arranged on an opposing side of the HDD pack receiving portion 411 via the pair of grip portions 420 and 430. The upper surface of the flat portion 410 has a positioning pin 353, a tripod screw (attaching mechanism) 354 threadably engaging with a tripod screw hole 334 of the above-described electronic camera 390, and connecting pins 356 provided near the circuit board 352.

The flat portion 410 has a DC inlet 357 connected to an external DC power supply such as an AC adapter.

The grip portions 420 and 430 have an outer shape easily gripped by the user. The grip portions 420 and 430 incorporate battery packs (second power supplies) 421 and 431, respectively, to increase the power supply capacity.

An upper surface 420a of the grip portion 420 has a release switch 422.

Even when the expansion unit 400 is attached to make it hard to operate the release switch 327 of the electronic camera 390, the same operability can be obtained because the grip portion 420 has the release switch 422.

An image quality selection switch 432 is attached to the rear side of the grip portion 430. The image quality selection switch 432 has four positions "HQ", "NORMAL", "EXT HQ", and "EXT NORMAL" which represent high-quality image recording in a memory card M, normal-quality image recording in the memory card M, high-quality image recording in an HDD pack H, and normal-quality image recording in the HDD pack H, respectively.

The electronic camera system 380 with the above arrangement is used in the following way. The electronic camera system 390 performs two operations: "normal mode" and "expansion mode". When the expansion unit 400 is not attached, the "normal mode" is set to sense an image like an ordinary electronic camera.

When the expansion unit 400 is attached, the "expansion mode" is set. The expansion unit 400 is attached by screwing the tripod screw 354 of the flat portion 410 into the tripod screw hole 334 of the electronic camera 390. At this time, the positioning pin 353 is inserted into the electronic camera 390 from the hole portion 332 to turn on the detection switch 333. Thus, the control circuit board 336 detects that the expansion unit 400 is attached, and the "expansion mode" is set.

When the distal ends of the connecting pins 356 abut against the contacts 331, the connecting pins 356 are pressed downward against the spring force of the compression springs 357. The connecting pins 356 and contacts 331 come into contact at a predetermined contact pressure. Hence, power is reliably supplied from the battery packs 421 and 431 to the electronic camera 390 side, and the circuit board 352 and control circuit board 336 are reliably connected to enable transmission/reception of image data or release signal. The image quality in recording and selection of the recording medium are switched by the image quality selection switch 432.

Figure 21:
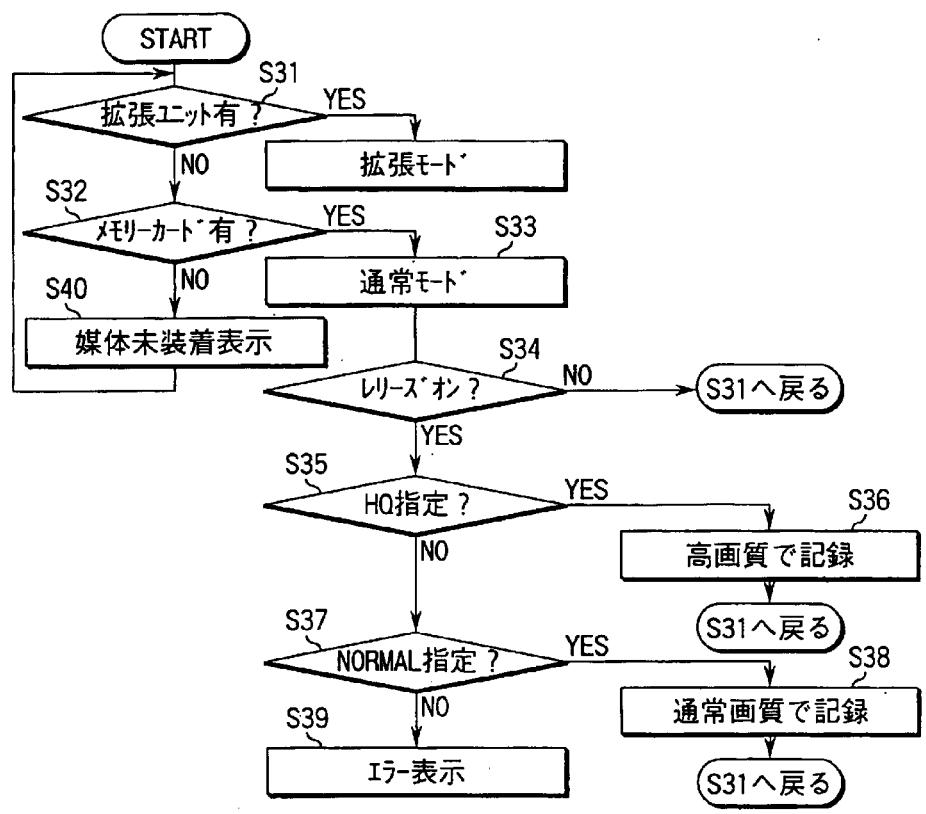
FIG. 21 is a flow chart for explaining operation of the electronic camera system according to the fourth embodiment of the present invention.
Figure 22:
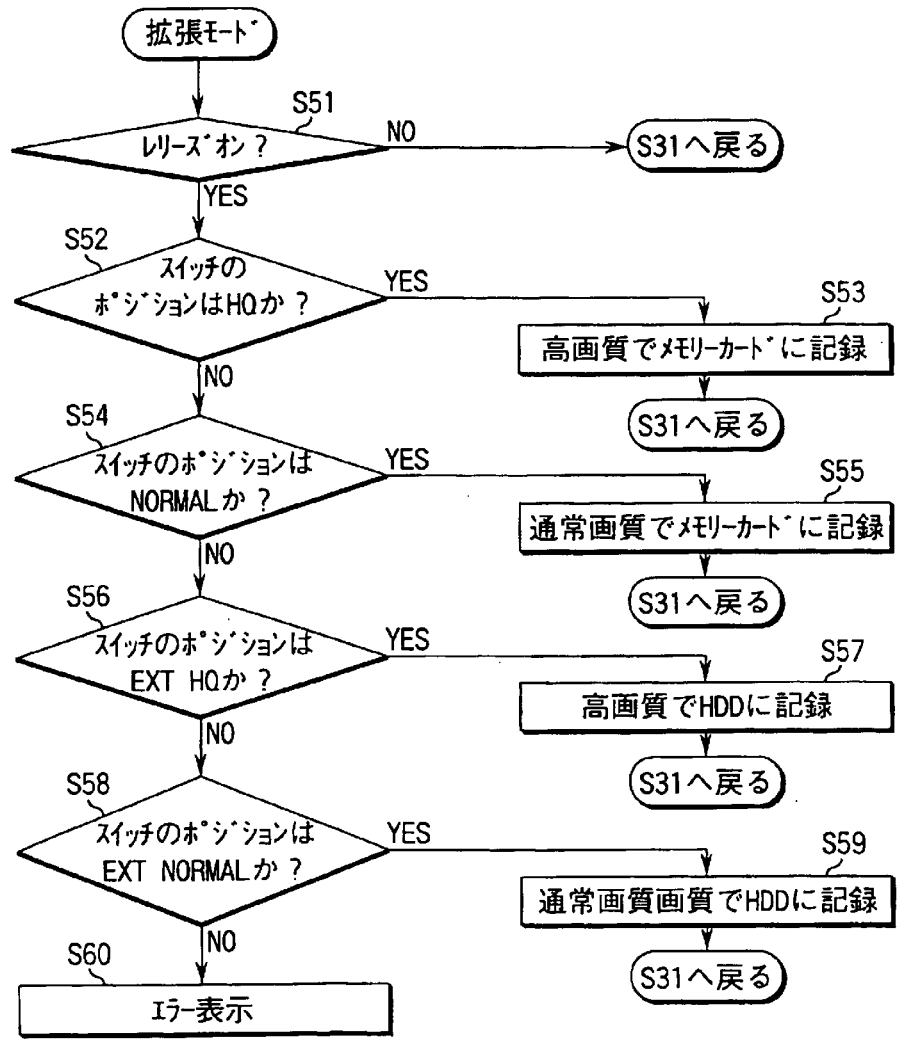
FIG. 22 is a flow chart for explaining operation of the electronic camera system according to the fourth embodiment of the present invention.

FIGS. 21 and 22 are flow charts for explaining operation of the electronic camera system according to the fourth embodiment of the present invention.

As shown in FIG. 21, first, it is determined whether the expansion unit is attached (S31). If NO in step S31, it is determined next whether the memory card is inserted (S32).

If NO in step S32, neither the memory card nor the HDD pack is inserted, so a message representing that no medium is inserted is displayed on the LCD (S40), and the flow returns to step S31.

If YES in step S32, the flow advances to the normal mode (S33) to determine whether the release is ON (S34).

If NO in step S34, the flow returns to step S31. If YES in step S34, it is determined whether the image quality selection switch 432 designates "HQ" (High Quality) (S35).

If YES in step S35, a high-quality image is recorded on the memory card (S36), and the flow returns to step S31. If NO in step S35, it is determined whether the image quality selection switch 432 designates "NORMAL" (S37).

If YES in step S37, a normal-quality image is recorded on the memory card (S38), and the flow returns to step S31. If NO in step S37, an error message is displayed on the LCD (S39).

If YES in step S31, the flow advances to the expansion mode shown in FIG. 22 to determine whether the release switch is ON (S51).

If NO in step S51, the flow returns to step S31. If YES in step S51, it is determined whether the image quality selection switch 432 indicates "HQ" (S52).

If YES in step S52, a high-quality image is recorded on the memory card (S53), and the flow returns to step S31. If NO in step S52, it is determined next whether the image quality selection switch 432 designates "NORMAL" (S54).

If YES in step S54, a normal-quality image is recorded on the memory card (S55), and the flow returns to step S31. If NO in step S54, it is determined next whether the image quality selection switch indicates "EXT HQ" (S56).

If YES in step S56, a high-quality image is recorded on the HDD (S57), and the flow returns to step S31. If NO in step S56, it is determined next whether the image quality selection switch 432 designates "EXT NORMAL" (S58).

If YES in step S58, a normal-quality image is recorded on the HDD (S59), and the flow returns to step S31. If NO in step S58, an error message is displayed on the LCD (S60).

As described above, the electronic camera system 380 according to the fourth embodiment can also obtain the same effects as those of the above-described electronic camera system 310.

When the expansion unit 400 also has the image quality selection switch 432, the quality of an image to be recorded can be switched, and the medium to record can be selected with the same operability as for the stand-alone electronic camera 390. When "HQ" or "NORMAL" is selected, recording in the HDD pack H is stopped. Hence, the expansion unit is used only as an expansion power supply for supplying power from the battery packs 421 and 431 to the electronic camera 390. In addition, this system can cope with continuous image sensing for an enormous number of images because the HDD pack H can be detachably exchanged.

The present invention is not limited to the above embodiment, and various changes and modifications can be made without departing from the spirit and scope of the present invention.

According to the electronic camera expansion unit of the present invention, the following effects are obtained. More specifically, when the expansion unit is attached, the electronic camera system can be more widely used as compared to the stand-alone electronic camera with a limited image data recording capacity or continues operable time. When the expansion unit is detached, the portability improves.

Since the grip portion which is gripped in place of the electronic camera when the external unit is attached is provided, and the second power supply as a heavy object is incorporated in the grip portion, the weight unbalance of the portable electronic camera can be prevented.

When the second recording medium having a rotating member easily affected by vibration is located on the grip portion side where displacement due to swing of the electronic camera is relatively small, the influence of vibration caused by camera shake can be minimized.

Also, when the circuit section having a relatively high resistance to vibration is located on a side separated from the grip, where displacement due to swing of the electronic camera is large, the remaining members easily affected by vibration can be laid out close to the grip. Hence, the influence of vibration caused by camera shake can be minimized.

Since the grip portion has a recessed portion, insertion/removal of the first recording medium is not impeded, and the operability does not degrade even when the expansion unit is attached.

Even when the expansion unit is attached to make it hard to operate the release switch of the electronic camera, the same operability can be obtained because the grip portion has the release switch.

Even when the expansion unit is being attached to the electronic camera, the second recording medium with a large capacity can be exchanged.

When the screw as an attaching mechanism is threadably engaged with the electronic camera to attach the expansion unit to the electronic camera, an appropriate contact pressure can be obtained for connection means, and image data can be reliably transmitted/received.

When the circuit section for controlling operation by the connection means and second recording medium is located at a position corresponding to the connection means, the wire leading distance can be minimized.

When a switch for inhibiting operation of the second recording medium is provided, the expansion unit can also be used only as an expansion power supply for supplying power from the second power supply to the electronic camera. Additionally, DC power from an AC adapter or the like can be received through line connection. Furthermore, the power supply capacity can further be increased by preparing a pair of grip portions sandwiching the electronic camera.

When the expansion unit has an image quality selection switch, the image quality can be switched also in consideration of the second recording medium with the same operability as that of the electronic camera.

On the other hand, according to the electronic camera system of the present invention, the following effects can be obtained. More specifically, when the expansion unit is attached, the electronic camera system can be more widely used as compared to the stand-alone electronic camera with a limited image data recording capacity or continues operable time. When the expansion unit is detached, the portability improves.

In addition, when the expansion unit is properly attached to the electronic camera by the projecting portion for positioning, which is formed on the expansion unit side, attachment can be detected, and connection can be reliably done.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera system comprising:

imaging means;

image data generation means for generating image data to be recorded in a recording medium by processing image information which is subject to photoelectric conversion by the imaging means;

a first recording medium receiving portion provided in an electronic camera to receive a first recording medium for recording image data generated by the image data generation means;

a second recording medium receiving portion for receiving a second recording medium which has a recording capacity larger than that of the first recording medium and which records the image data generated by the data generation means, in which the first recording medium and the second recording medium are independently detachable;

a first power supply provided in the electronic camera to supply power in writing the image data on at least the first recording medium;

a second power supply having a power supply capacity larger than that of said first power supply; and an electronic camera expansion unit for receiving said second power supply, said electronic camera expansion unit being detachable from the electronic camera, wherein said second power supply supplies power to write data on the second recording medium when said electronic camera expansion unit is attached to the electronic camera.

2. A system according to claim 1, further comprising:

determination means for determining whether said electronic camera expansion unit is attached to the electronic camera, and notification means for, when the second recording medium is inserted into said second recording medium receiving portion, and said determination means determines that said electronic camera expansion unit is not attached to the electronic camera, notifying a user that said electronic camera expansion unit is not attached to the electronic camera.

3. A system according to claim 1, further comprising:

determination means for determining whether said electronic camera expansion unit is attached to the electronic camera, and means for, when said determination means determines that said electronic camera expansion unit is not attached to the electronic camera, inhibiting drive of the second recording medium and a write/read of image data.

4. A system according to claim 1, wherein said electronic camera expansion unit comprises:

a grip portion incorporating said second power supply, and a substantially plate like flat portion having an end face integrated with said grip portion, and attached to a bottom surface of the electronic camera.

5. A system according to claim 1, wherein the electronic camera further comprises:
a first power supply receiving portion for receiving said first power supply, said electronic camera expansion unit further comprises:
a unit main body,
a second power supply receiving portion for receiving said second power supply,
an attaching mechanism for detachably attaching said unit main body to the electronic camera, and
data connection means, electrically connected to the electronic camera, for transmitting/receiving the image data, and said second recording medium receiving portion is provided in said unit main body.

6. A system according to claim 1, wherein said unit main body comprises:

a grip portion incorporating said second power supply receiving portion and arranged on an end portion side in a horizontal direction of the electronic camera, and a substantially plate like flat portion integrated with an end portion of said grip portion and attached to a bottom surface of the electronic camera, and incorporating said second recording medium receiving portion and having said data connection means formed at an abutment portion against the bottom surface of the electronic camera.

7. A system according to claim 6, wherein:

said second recording medium has a rotating member, and said second recording medium receiving portion is arranged on a side of said grip portion of said flat portion.

8. A system according to claim 6, wherein said flat portion has, at a position separated from said grip portion via said second recording medium receiving portion, a circuit section for executing the write/read of the image data on/from the second recording medium and transmission/reception of the image data through said connection means by power supplied from said second power supply.

9. A system according to claim 6, wherein:
the electronic camera has a cover for protecting an insertion port of the first recording medium into said first recording medium receiving portion, and
said grip portion has a recessed portion configured so as not to impede opening/closing said cover.

10. A system according to claim 6, wherein said grip portion has, at an upper portion, a release switch for instructing a release operation in the electronic camera.

11. A system according to claim 5, wherein:
the second recording medium can be freely removed from said second recording medium receiving portion, and
said second recording medium receiving portion is arranged at a portion where the second recording medium can be removed even while said unit main body is being attached to the electronic camera.

12. A system according to claim 5, wherein:
said attaching mechanism has a screw threadably engaging with a tripod screw hole of the electronic camera, and
said connection means has a plurality of contacts disposed on a circumference centered on said screw.

13. A system according to claim 6, wherein said flat portion has, at positions corresponding to the plurality of contacts forming said connection means, a circuit section for executing the write/read of the image data on/from the second recording medium and transmission/reception of the image data through said connection means by power supplied from said second power supply.

14. A system according to claim 5, wherein said unit main body further comprises a switch for inhibiting the write/read of the image data on/from the second recording medium.

15. A system according to claim 5, wherein said unit main body further comprises an input terminal for supplying external DC power to said electronic camera.

16. A system according to claim 6, wherein said grip portion has a pair of members sandwiching the electronic camera from a front side and rear side, each of said pair of members having said second power supply receiving portion.

17. A system according to claim 16, wherein:
the electronic camera has, on a rear surface side, a first image quality selection switch for switching an image quality, and
one of said pair of members, which is located on the rear surface side of the electronic camera, covers said first image quality selection switch, and has a second image quality selection switch having an image quality selection position for simultaneously instructing priority recording on the second recording medium.

18. A system according to claim 1, wherein
the electronic camera comprises:
detection means for detecting an attached state of said electronic camera expansion unit to the electronic camera, and
a first power supply receiving portion for receiving said first power supply, and
said electronic camera expansion unit comprises:
the second recording medium receiving portion,
a second power supply receiving portion for receiving said second power supply,
an attaching mechanism for attaching a unit main body of said electronic camera expansion unit to the electronic camera, and
connection means, electrically connected to the electronic camera, for transmitting/receiving the image data.

19. A system according to claim 18, wherein:
said attaching mechanism has, on an abut surface against the electronic camera, a projecting portion for positioning the electronic camera, and
said detection means is arranged at a position corresponding to the projecting portion to detect that the projecting portion abuts.

20. A system according to claim 1, wherein the first recording medium comprises a memory card, and the second recording medium comprises a hard disk.

* * * * *

UNITED STATES PATENT AND TRADEMARK OFFICE
CERTIFICATE OF CORRECTION

PATENT NO. : 6,873,367 B1
DATED : March 29, 2005
INVENTOR(S) : Rolfe

It is certified that error appears in the above-identified patent and that said Letters Patent is hereby corrected as shown below:

<u>Column 1,</u>
Line 44, "filed", should read -- field --;

<u>Column 3,</u>
Line 47, "milage", should read -- mileage --;

<u>Column 4,</u>
Line 39, "DESCRIPTION OF PREFERRED EMBODIMENT
            (S)", should read
    -- DESCRIPTION OF PREFERRED EMBODIMENT(S) --;

<u>Column 5,</u>
Line 6, "I", should read -- 1 --;
Line 18, "I", should read -- 1 --;

<u>Column 6,</u>
Line 25, "1 2", should read -- 1,2 --;
Lines 46 and 51, "12 13", should read -- 12,13 --;
Line 56, "10 11", should read -- 10,11 --;
Line 58, "10 12", should read -- 10,12 --;
Line 59, "10 11", should read -- 10,11 --;

<u>Column 7,</u>
Line 2, "12 13", should read -- 12,13 --;
Lines 26 and 28, "10 11", should read -- 10,11 --;

UNITED STATES PATENT AND TRADEMARK OFFICE
CERTIFICATE OF CORRECTION

PATENT NO. : 6,873,367 B1
DATED : March 29, 2005
INVENTOR(S) : Rolfe

It is certified that error appears in the above-identified patent and that said Letters Patent is hereby corrected as shown below:

Column 8,
Line 60, "change", should read -- Change --;

Column 9,
Line 1, "driver not", should read -- driver does not --;
Line 10, "from the of many", should read -- from the many --;

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO.     : 6,873,367 B1
DATED          : March 29, 2005
INVENTOR(S)    : Ryuji Hirata et al.

It is certified that error appears in the above-identified patent and that said Letters Patent is hereby corrected as shown below:

This certificate supersedes Certificate of Correction issued July 12, 2005, the number was erroneously mentioned and should be vacated since no certificate of correction was granted.

Signed and Sealed this

Eleventh Day of October , 2005

JON W. DUDAS
*Director of the United States Patent and Trademark Office*